United States Patent
Lee et al.

(10) Patent No.: US 9,472,983 B2
(45) Date of Patent: Oct. 18, 2016

(54) WIRELESS POWER TRANSMITTER AND METHOD FOR CONTROLLING SAME

(71) Applicant: Samsung Electronics Co., Ltd., Gyeonggi-do (KR)

(72) Inventors: Kyung-Woo Lee, Seoul (KR); Kang-Ho Byun, Gyeonggi-do (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 234 days.

(21) Appl. No.: 14/202,641

(22) Filed: Mar. 10, 2014

(65) Prior Publication Data

US 2014/0253028 A1   Sep. 11, 2014

(30) Foreign Application Priority Data

Mar. 8, 2013   (KR) ........................ 10-2013-0024937

(51) Int. Cl.
*H02J 7/02*   (2016.01)
*H02J 17/00*   (2006.01)

(52) U.S. Cl.
CPC ..................... *H02J 17/00* (2013.01)

(58) Field of Classification Search
CPC ....................................... H02J 7/025
USPC ........................................ 320/108
See application file for complete search history.

(56) References Cited

U.S. PATENT DOCUMENTS

| | | | | |
|---|---|---|---|---|
| 2005/0289393 A1* | 12/2005 | Bibikar | ..................... | G06F 1/30 714/14 |
| 2009/0127936 A1 | 5/2009 | Kamijo et al. | | |
| 2009/0174264 A1 | 7/2009 | Onishi et al. | | |
| 2010/0083012 A1* | 4/2010 | Corbridge | ............. | G06F 1/1632 713/300 |
| 2011/0291489 A1 | 12/2011 | Tsai et al. | | |
| 2012/0212070 A1 | 8/2012 | Tanabe | | |
| 2012/0235636 A1* | 9/2012 | Partovi | ................... | H02J 7/025 320/108 |
| 2012/0293007 A1 | 11/2012 | Byun et al. | | |
| 2012/0326524 A1 | 12/2012 | Matsumoto et al. | | |
| 2013/0027078 A1 | 1/2013 | Nakano et al. | | |
| 2013/0057078 A1* | 3/2013 | Lee | ........................... | H02J 7/00 307/104 |
| 2013/0181665 A1 | 7/2013 | Lee et al. | | |
| 2014/0088893 A1* | 3/2014 | McGuire | ................ | G01D 21/00 702/58 |
| 2014/0253028 A1* | 9/2014 | Lee | ........................ | H02J 17/00 320/108 |
| 2015/0002090 A1 | 1/2015 | Nakaya et al. | | |

FOREIGN PATENT DOCUMENTS

| | | |
|---|---|---|
| JP | 5147999 | 12/2012 |
| KR | 1020130084619 | 7/2013 |

OTHER PUBLICATIONS

European Search Report dated Nov. 28, 2014 issued in counterpart application No. 14158289.0-1804.

* cited by examiner

*Primary Examiner* — Edward Tso
*Assistant Examiner* — Dung V Bui
(74) *Attorney, Agent, or Firm* — The Farrell Law Firm, P.C.

(57) ABSTRACT

A method for controlling a wireless power transmitter that transmits charging power to a wireless power receiver is provided. The method includes driving the wireless power transmitter; determining whether latch fault mode entry conditions are met, in which the wireless power transmitter is allowed to enter a latch fault mode in which the wireless power transmitter periodically applies first power having a first power value in a first cycle; and if the latch fault mode entry conditions are met, periodically applying the first power in the first cycle.

23 Claims, 10 Drawing Sheets

WIRELESS POWER TRANSMITTER AND METHOD FOR CONTROLLING SAME

PRIORITY

This application claims priority under 35 U.S.C. §119(a) to a Korean Patent Application filed in the Korean Intellectual Property Office on Mar. 8, 2013 and assigned Serial No. 10-2013-0024937, the entire disclosure of which is incorporated herein by reference.

BACKGROUND

1. Field of the Invention

The present invention relates generally to a wireless power transmitter and a method for controlling the same, and more particularly, to a wireless power transmitter for transmitting charging power to a wireless power receiver, and a method for controlling the same.

2. Description of the Related Art

A mobile terminal, such as a cellular phone or a Personal Digital Assistant (PDA), is powered by a rechargeable battery facilitate to its mobility. In order to charge the battery, electrical energy is supplied to the battery of the mobile terminal using a separate charging device. Typically, the charging device and the battery have separate contact terminals mounted on outer surfaces thereof, such that they may be electrically connected when their contact terminals contact each other.

However, in this contact charging technique, since the contact terminals protrude outside, they are apt to be contaminated by rogue (or foreign) substances, causing a failure in battery charging. The battery charging may fail even if the contact terminals are exposed to moisture.

In order to address these and other disadvantages, wireless charging or contactless charging technologies have been developed and used in many electronic devices.

In the wireless charging technology that uses wireless power transmission/reception, a battery of a mobile terminal may be automatically charged if the mobile terminal is simply placed on a charging pad without being connected to a charging device via a separate charging connector. Generally, the wireless charging technology is well known to the public and may improve the portability of electronic devices due to eliminating the need for a wired charger. As a result, the related technologies are expected to significantly evolve even in the coming electric car era.

These wireless charging technologies may be roughly classified into a coil-based electromagnetic induction scheme, a resonance scheme, and a radio radiation scheme (also known as an Radio Frequency (RF)/micro wave radiation scheme) that delivers electrical energy by converting it into microwaves.

Up to the present, the electromagnetic induction scheme has mainly been used. However, as experiments involving wirelessly transmitting power over distances of tens of meters using microwaves have been successful, the possibility exists that all electronic products may be wirelessly charged anytime and anywhere in the near future.

The electromagnetic induction-based power transmission method is a scheme of transmitting power between a primary coil and a secondary coil. If a magnet moves around a coil, an induced current occurs. Based on this principle, a transmitter generates a magnetic field, and a receiver generates electrical energy as a current is induced due to a change in the magnetic field. This phenomenon is called an electromagnetic induction phenomenon, and the electromagnetic induction-based power transmission method has excellent energy transfer efficiency.

The resonance scheme provides a system in which electricity may be wirelessly transferred to an electronic device using the resonance-based power transmission principle even though the electronic device is at a distance of several meters from a charging device. This wireless charging system is based on the physics concept called 'resonance', in which electromagnetic waves containing electrical energy are caused to resonate. The resonating electrical energy may be directly delivered only to an electronic device having a resonant frequency, and the unused electrical energy may be re-absorbed as an electromagnetic field instead of being spread into the air. Therefore, unlike the electromagnetic waves, the electrical energy does not seem to affect the nearby machine and human bodies.

Although many studies on wireless charging schemes have been made, no standard has been proposed for, for example, wireless charging priority, search for a wireless power transmitter/receiver, selection of a communication frequency between a wireless power transmitter and a wireless power receiver, adjustment of wireless power, selection of a matching circuit, and distribution of a communication time for each of wireless power receivers in one charging cycle. In particular, there is a need for a standard for the configuration and procedure in which a wireless power receiver selects a wireless power transmitter from which the wireless power receiver will receive wireless power.

In particular, there is a need for the development of new technology for efficiently determining whether a rogue object is withdrawn or removed, if an error occurs while a wireless power receiver or the rogue object is placed on the wireless power transmitter.

SUMMARY

The present invention has been made to address at least the above-mentioned problems and/or disadvantages and to provide at least the advantages described below.

Accordingly, an aspect of the present invention is to provide a wireless power transmitter for efficiently determining whether a rogue object is withdrawn or removed, if an error occurs while a wireless power receiver or the rogue object is placed on the wireless power transmitter, and a method for controlling the same.

In accordance with an aspect of the present invention, there is provided a method for controlling a wireless power transmitter that transmits charging power to a wireless power receiver. The method includes driving the wireless power transmitter; determining whether latch fault mode entry conditions are met, in which the wireless power transmitter is allowed to enter a latch fault mode in which the wireless power transmitter periodically applies first power having a first power value in a first cycle; and if the latch fault mode entry conditions are met, periodically applying the first power in the first cycle.

In accordance with another aspect of the present invention, there is provided a wireless power transmitter for transmitting charging power to a wireless power receiver. The wireless power transmitter includes a driver configured to drive the wireless power transmitter; a power transmitting unit configured to transmit the charging power to the wireless power receiver; and a controller configured to determine whether latch fault mode entry conditions are met, in which the wireless power transmitter is allowed to enter a latch fault mode in which the wireless power transmitter periodically applies first power having a first power value in a first cycle, and if the latch fault mode entry conditions are met, to periodically apply the first power to the power transmitting unit in the first cycle.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF THE EMBODIMENTS OF THE PRESENT INVENTION

The following description with reference to the accompanying drawings is provided to assist in a comprehensive understanding of embodiments of the present invention as defined by the claims and their equivalents. It includes various specific details to assist in that understanding but these are to be regarded as mere examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their dictionary meanings, but, are merely used to enable a clear and consistent understanding of the invention. Accordingly, it should be apparent to those skilled in the art that the following description of embodiments of the present invention is provided for illustration purpose only and not for the purposes of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
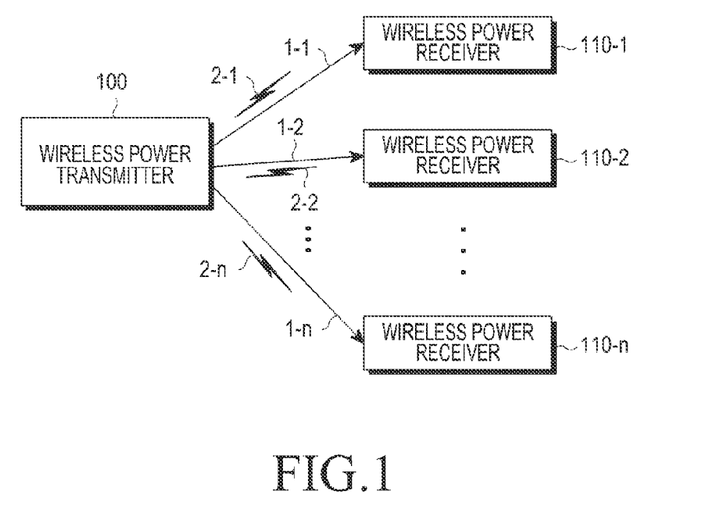
FIG. 1 is a conceptual diagram illustrating the overall operation of a wireless charging system.

FIG. 1 is a conceptual diagram illustrating the overall operation of a wireless charging system. As illustrated in FIG. 1, the wireless charging system includes a wireless power transmitter 100 and at least one wireless power receiver 110-1, 110-2 and 110-n.

The wireless power transmitter 100 wirelessly transmits power 1-1, 1-2 and 1-n to the wireless power receivers 110-1, 110-2 and 110-n, respectively. More specifically, the wireless power transmitter 100 wirelessly transmits the power 1-1, 1-2 and 1-n only to the wireless power receivers, which are authenticated or authorized through a predetermined authentication procedure with the wireless power transmitter 100.

The wireless power transmitter 100 may form or make an electrical connection to the wireless power receivers 110-1, 110-2 and 110-n. For example, the wireless power transmitter 100 may transmit wireless power in the form of electromagnetic wave to the wireless power receivers 110-1, 110-2 and 110-n.

The wireless power transmitter 100 may perform two-way communication with the wireless power receivers 110-1, 110-2 and 110-n. The wireless power transmitter 100 and the wireless power receivers 110-1, 110-2 and 110-n may process or transmit/receive packets 2-1, 2-2 and 2-n, which are configured in the form of a predetermined frame, which will be described in detail below. The wireless power receivers may be implemented as, for example, mobile communication terminals, Personal Digital Assistants (PDAs), Personal Multimedia Players (PMPs), smart phones, and the like.

The wireless power transmitter 100 may wirelessly provide power to a plurality of wireless power receivers 110-1, 110-2 and 110-n. For example, the wireless power transmitter 100 may transmit power to the plurality of wireless power receivers 110-1, 110-2 and 110-n using the resonance scheme. If the wireless power transmitter 100 adopts the resonance scheme, the distance between the wireless power transmitter 100 and the plurality of wireless power receivers 110-1, 110-2 and 110-n may be 30 m or less. If the wireless power transmitter 100 adopts the electromagnetic induction scheme, the distance between the wireless power transmitter 100 and the plurality of wireless power receivers 110-1, 110-2 and 110-n may be 10 cm or less.

The wireless power receivers 110-1, 110-2 and 110-n receive wireless power from the wireless power transmitter 100 and charge a battery mounted therein using the received power. The wireless power receivers 110-1, 110-2 and 110-n may transmit, to the wireless power transmitter 100, a signal requesting transmission of wireless power, information needed to receive wireless power, the wireless power receiver's status information, control information for the wireless power transmitter 100, and the like. Information about the transmitted signal will be described in more detail below.

The wireless power receivers 110-1, 110-2 and 110-n may send a message indicating their charging state to the wireless power transmitter 100.

The wireless power transmitter 100 may include a display means such as a display, and may display a state of each of the wireless power receivers 110-1, 110-2 and 110-n based on the message received from each of the wireless power receivers 110-1, 110-2 and 110-n. In addition, the wireless power transmitter 100 may display the expected time that each of the wireless power receivers 110-1, 110-2 and 110-n will be fully charged.

The wireless power transmitter 100 may transmit a control signal for disabling a wireless charging function, to each of the wireless power receivers 110-1, 110-2 and 110-n. Upon receiving the control signal for disabling a wireless charging function from the wireless power transmitter 100, the wireless power receiver disables its wireless charging function.

Figure 2A:
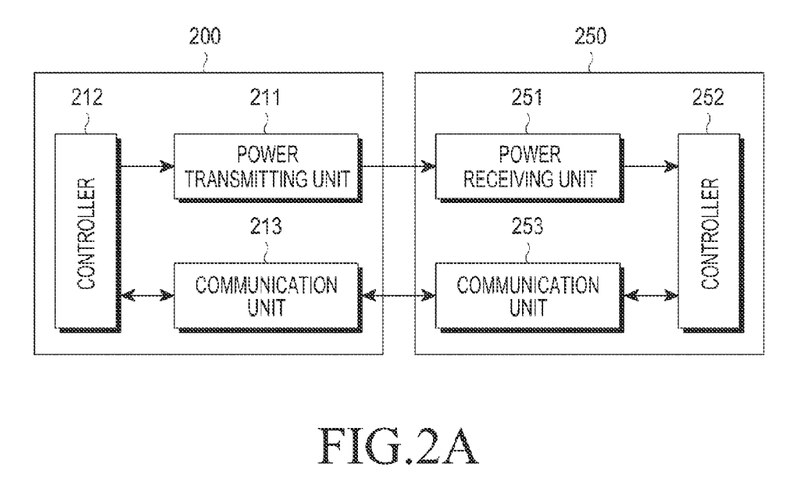
FIG. 2A is a block diagram of a wireless power transmitter and a wireless power receiver according to an embodiment of the present invention.

FIG. 2A is a block diagram of a wireless power transmitter and a wireless power receiver according to an embodiment of the present invention.

As illustrated in FIG. 2A, a wireless power transmitter (or Power Transmission Unit (PTU)) 200 includes a power transmitting unit 211, a controller 212 and a communication unit 213. A wireless power receiver (or Power Reception Unit (PRU)) 250 includes a power receiving unit 251, a controller 252 and a communication unit 253.

The power transmitting unit 211 provides the power required by the wireless power transmitter 200, and wirelessly supplies the power to the wireless power receiver 250. The power transmitting unit 211 supplies the power in the form of an Alternating Current (AC) waveform, but may also supply the power in the form of a Direct Current (DC) waveform and convert it into power in the form of an AC waveform using an inverter to supply the power as an AC waveform. The power transmitting unit 211 may be implemented in the form of a built-in battery, or may be implemented in the form of a power receiving interface to receive power from the outside and supply it to other components. It will be apparent to those of ordinary skill in the art that the power transmitting unit 211 is not limited as long as it is a means capable of supplying power in the form of an AC waveform.

In addition, the power transmitting unit 211 may supply AC power to the wireless power receiver 250 in the form of an electromagnetic wave. The power transmitting unit 211 may additionally include a loop coil, so it may transmit or receive predetermined electromagnetic waves. If the power transmitting unit 211 is implemented with a loop coil, an inductance L of the loop coil may be subject to change. It will be apparent to those of ordinary skill in the art that the power transmitting unit 211 is not limited as long as it is a means capable of transmitting and receiving electromagnetic waves.

The controller 212 controls the overall operation of the wireless power transmitter 200. The controller 212 controls the overall operation of the wireless power transmitter 200 using an algorithm, a program or an application, each of which is read from a storage unit and required for the control. The controller 212 may be implemented in the form of Central Processing Unit (CPU), microprocessor, minicomputer or the like. The detailed operation of the controller 212 will be described in more detail below.

The communication unit 213 communicates with the wireless power receiver 250 using a predetermined communication scheme. The communication unit 213 communicates with the communication unit 253 in the wireless power receiver 250, using Near Field Communication (NFC), Zigbee, Infrared Data Association (IrDA), Visual Light Communication (VLC), Bluetooth, Bluetooth Low Energy (BLE), or the like. The communication unit 213 of an embodiment of the present invention may perform communication using IEEE802.15.4 Zigbee or BLE. In addition, the communication unit 213 may use a Carrier Sense Multiple Access/Collision Avoidance (CSMA/CA) algorithm. A configuration for selecting the frequency and channel used by the communication unit 213 will be described in more detail below. The above-mentioned communication schemes are merely illustrative, and in terms of the scope, embodiments of the present invention are not limited to a specific communication scheme performed in the communication unit 213.

The communication unit 213 transmits a signal for information of the wireless power transmitter 200. The communication unit 213 may transmit the signal in a unicast, multicast or broadcast manner. Table 1 illustrates a data structure of a signal transmitted by the wireless power transmitter 200 according to an embodiment of the present invention. The wireless power transmitter 200 transmits a signal having the following frame structure at preset intervals, and the signal may be referred to as a Notice signal.

TABLE 1

| frame type | protocol version | sequence number | network ID | Rx to Report(schedule mask) | Reserved | Number of Rx |
|---|---|---|---|---|---|---|
| Notice | 4 bits | 1 Byte | 1 Byte | 1 Byte | 5 bits | 3 bits |

In Table 1, "frame type" is a field indicating a type of the signal, and indicates that the signal is a Notice signal. A "protocol version" field is a field indicating a protocol type of a communication scheme, and may be allocated, for example, 4 bits. A "sequence number" field is a field indicating a sequential order of the signal, and may be allocated, for example, 1 byte. A sequence number may increase one by one to correspond to, for example, a transmission/reception phase of the signal. A "network ID" field is a field indicating a network ID of the wireless power transmitter 200, and may be allocated, for example, 1 byte. An "Rx to Report (schedule mask)" field is a field indicating wireless power receivers scheduled make a report to the wireless power transmitter 200, and may be allocated, for example, 1 byte.

Table 2 illustrates the "Rx to Report (schedule mask)" field according to an exemplary embodiment of the present disclosure.

TABLE 2

| Rx to Report(schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 correspond to wireless power receivers #1 to #8. The "Rx to Report (schedule mask)" field may be implemented such that a wireless power receiver, a number of whose schedule mask is marked as '1', may make a report.

A "Reserved" field is a field reserved for its future use, and may be allocated, for example, 5 bits. A "Number of Rx" field is a field indicating the number of wireless power receivers around the wireless power transmitter 200, and may be allocated, for example, 3 bits.

A signal in the frame format of Table 1 may be implemented to be allocated to Wireless Power Transfer (WPT) in the IEEE802.15.4 data structure. Table 3 illustrates the IEEE802.15.4 data structure.

TABLE 3

| Preamble | SFD | Frame Length | WPT | CRC16 |
| --- | --- | --- | --- | --- |

As illustrated in Table 3, the IEEE802.15.4 data structure includes Preamble, Start-of-Frame Delimiter (SFD), Frame Length, WPT, and Cyclic Redundancy Check 16 (CRC16) fields, and the data structure in Table 1 may be included in the WPT field.

The communication unit 213 receives power information from the wireless power receiver 250. The power information may include at least one of capacity of the wireless power receiver 250, battery level, charging count, usage, battery capacity, and battery percentage. The communication unit 213 transmits a charging function control signal for controlling a charging function of the wireless power receiver 250. The charging function control signal may be a control signal for controlling the power receiving unit 251 in the wireless power receiver 250 to enable or disable the charging function of the wireless power receiver 250.

The communication unit 213 may receive a signal not only from the wireless power receiver 250, but also from other wireless power transmitters (not shown). For example, the communication unit 213 may receive a Notice signal in a form of the frame in Table 1 from another wireless power transmitter.

Although it is assumed in FIG. 2A that the wireless power transmitter 200 communicates in an out-band way as the power transmitting unit 211 and the communication unit 213 are configured as different hardware, this is merely illustrative. Alternatively, the wireless power transmitter 200 may communicate in an in-band way, when the power transmitting unit 211 and the communication unit 213 are configured as a single piece of hardware.

The wireless power transmitter 200 and the wireless power receiver 250 transmit and receive various signals. Accordingly, a charging process may be performed, in which the wireless power receiver 250 may join the wireless power network managed by the wireless power transmitter 200 and transmit/receive wireless power. This process will be described in more detail below.

Figure 2B:
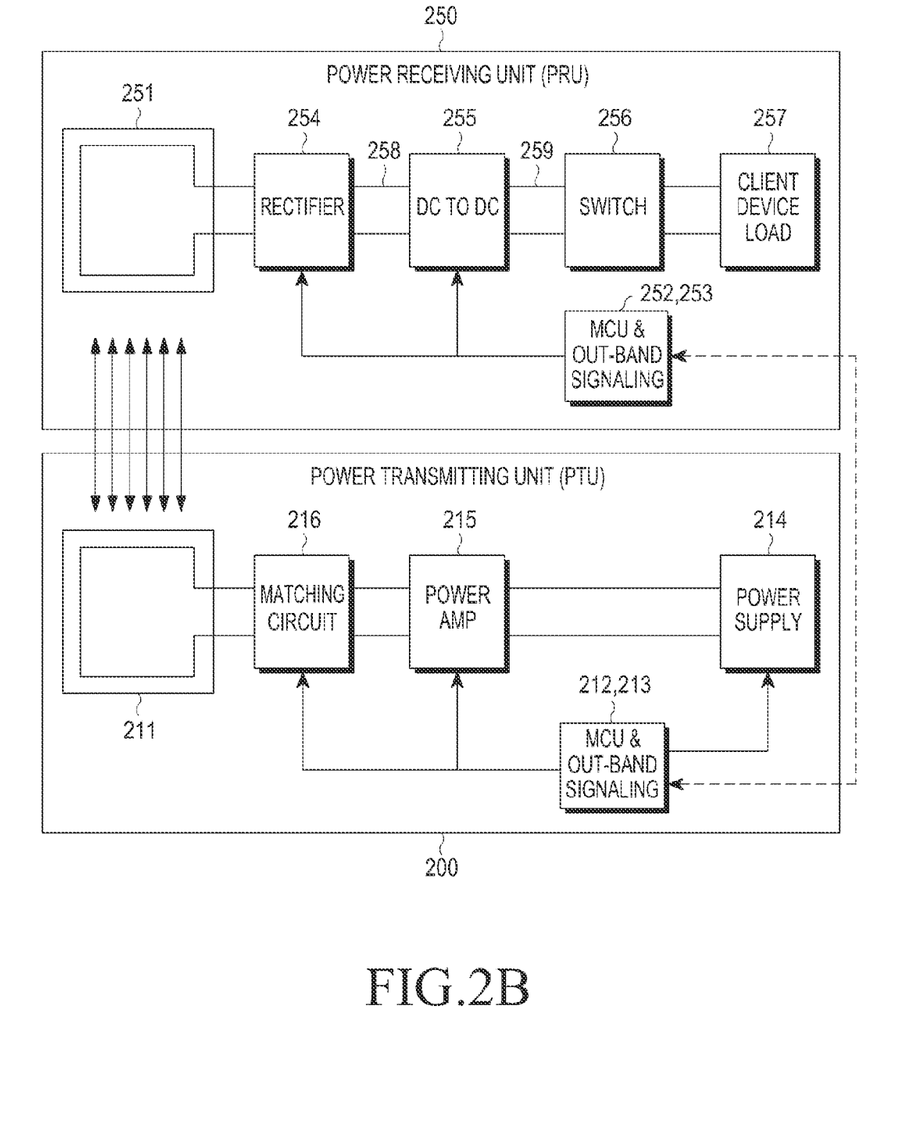
FIG. 2B is a detailed block diagram of a wireless power transmitter and a wireless power receiver according to an embodiment of the present invention.

FIG. 2B is a detailed block diagram of a wireless power transmitter and a wireless power receiver according to an embodiment of the present invention.

As illustrated in FIG. 2B, the wireless power transmitter (or PTU) 200 includes the power transmitting unit 211, a control & communication unit (or Micro-Controller Unit (MCU) & out-band signaling unit) 212/213, a driver (or power supply) 214, an amplifier (or power amplifier) 215, and a matcher (or matching circuit) 216. The wireless power receiver (or PRU) 250 includes the power receiving unit 251, a control & communication unit 252/253, a rectifier 254, a DC-to-DC (DC/DC) converter 255, a switching unit 256, and a load unit (or client device load) 257.

The driver 214 outputs DC power having a preset voltage value. The voltage value of the DC power output from the driver 214 is controlled by the control & communication unit 212/213.

A DC current output from the driver 214 is output to the amplifier 215. The amplifier 215 amplifies the DC current with a preset gain. In addition, the amplifier 215 converts the DC power into AC power based on a signal received from the control & communication unit 212/213. Accordingly, the amplifier 215 outputs AC power.

The matcher 216 performs impedance matching. For example, the matcher 216 may adjust the impedance seen from the matcher 216 to ensure high efficiency or high output for the output power. The matcher 216 may adjust the impedance under control of the control & communication unit 212/213. The matcher 216 may include at least one of a coil and a capacitor. The control & communication unit 212/213 may control its connection to at least one of the coil and the capacitor, and may perform impedance matching according thereto.

The power transmitting unit 211 transmits the input AC power to the power receiving unit 251. The power transmitting unit 211 and the power receiving unit 251 may be implemented with resonance circuits having the same resonant frequency. For example, the resonant frequency may be determined to be 6.78 MHz.

The control & communication unit 212/213 communicates with the control & communication unit 252/253 in the wireless power receiver 250, and may perform two-way communication using a frequency of, for example, 2.4 GHz.

The power receiving unit 251 receives charging power.

The rectifier 254 rectifies the wireless power received at the power receiving unit 251 into DC power, and may be implemented in the form of, for example, bridge diode. The DC/DC converter 255 converts the rectified power with a preset gain. For example, the DC/DC converter 255 may convert the rectified power so that a voltage at its output terminal 259 may be 5V. The minimum and maximum values of a voltage, which can be applied to an input terminal 258 of the DC/DC converter 255, may be set in advance.

The switching unit 256 connects the DC/DC converter 255 to the load unit 257. The switching unit 256 keeps its on/off state under control of the control & communication unit 252/253. The load unit 257 stores the converted power received from the DC/DC converter 255, if the switching unit 256 is turned on.

Figure 3:
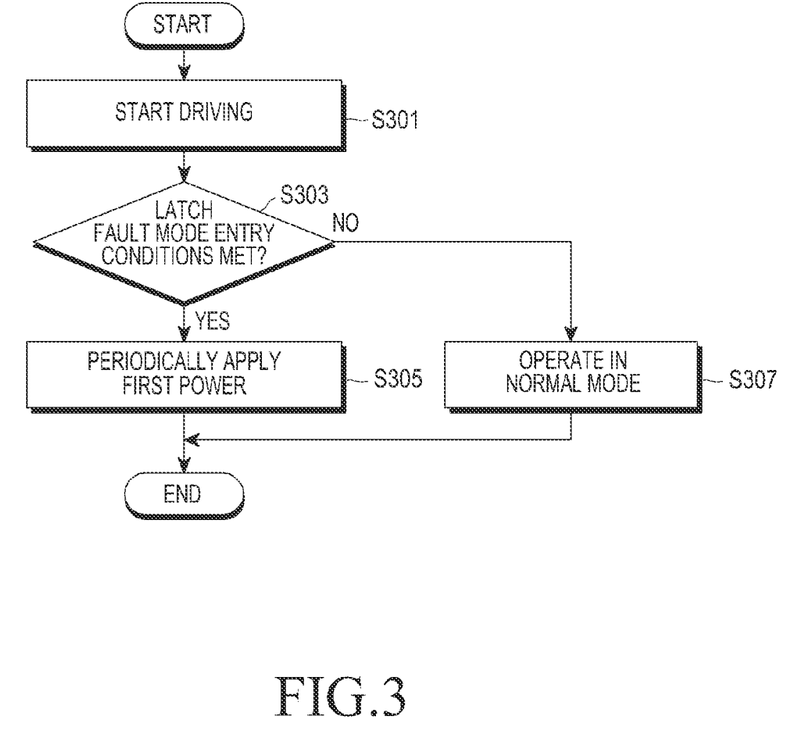
FIG. 3 is a flowchart illustrating a control method of a wireless power transmitter according to an embodiment of the present invention.

FIG. 3 is a flowchart illustrating a control method of a wireless power transmitter according to an embodiment of the present invention.

As illustrated in FIG. 3, the wireless power transmitter starts driving, or is powered up, in step S301. In addition, the wireless power transmitter determines whether latch fault mode entry conditions are met, in which the wireless power transmitter enters a latch fault mode in step S303. The term "latch fault mode" as used herein refers to a mode in which the wireless power transmitter applies first power to the power transmitting unit 211 in FIG. 2A or 2B for a first period in a first cycle. The latch fault mode will be described in more detail with reference to FIG. 5. In addition, the term "latch fault mode entry conditions" as used herein refers to conditions in which, for example, a rogue object other than a wireless power receiver is placed on the wireless power transmitter. Further, the latch fault mode entry conditions may correspond to various other conditions in addition to the conditions in which a rogue object is placed on the wireless power transmitter. This will be described in more detail below.

If the latch fault mode entry conditions are met in step S303, the wireless power transmitter periodically applies the first power in step S305.

On the other hand, if the latch fault mode entry conditions are not met in step S303, the wireless power transmitter operates in the normal mode in step S307.

Figure 4:
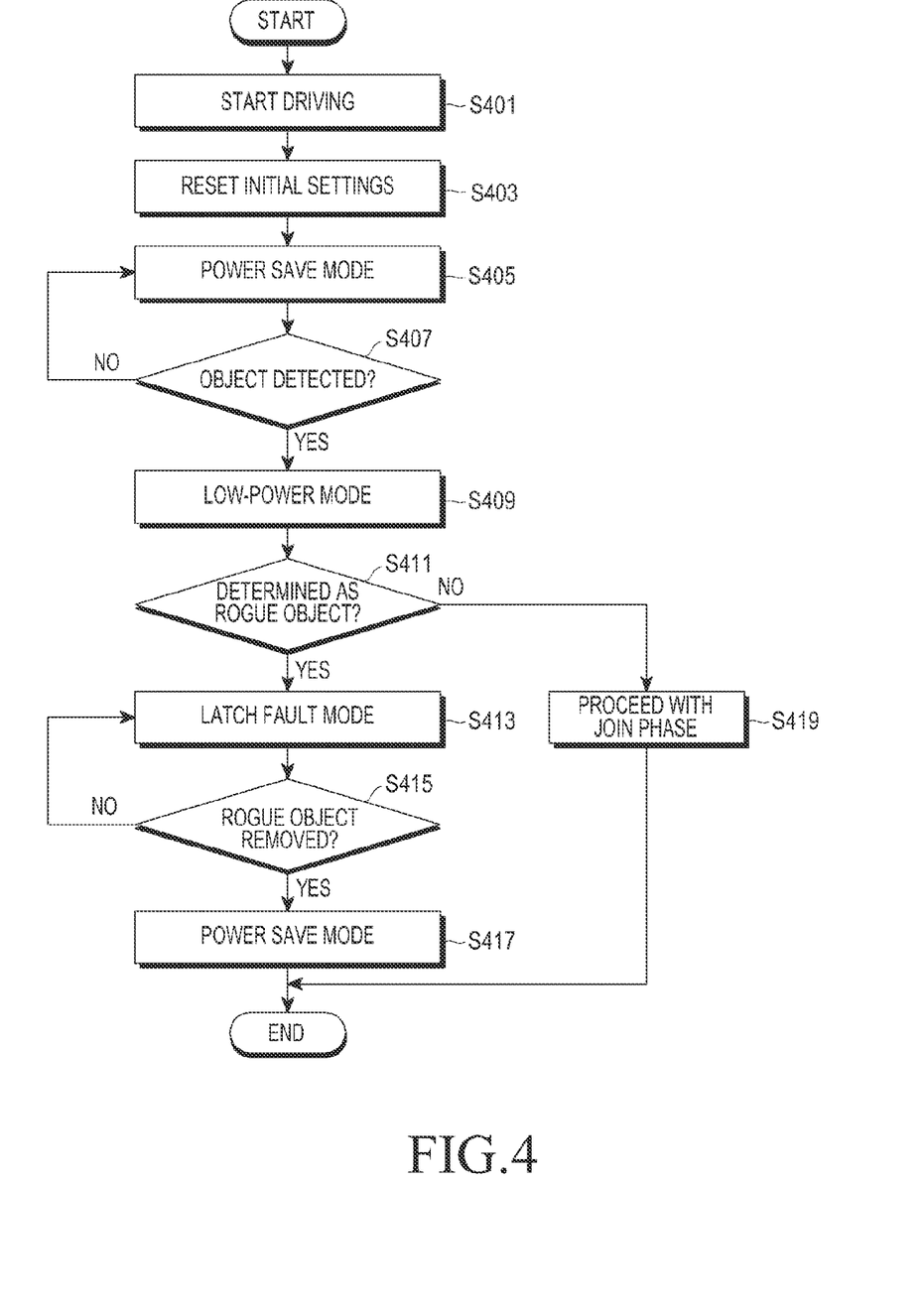
FIG. 4 is a flowchart illustrating a control method of a wireless power transmitter according to another embodiment of the present invention.
Figure 5:
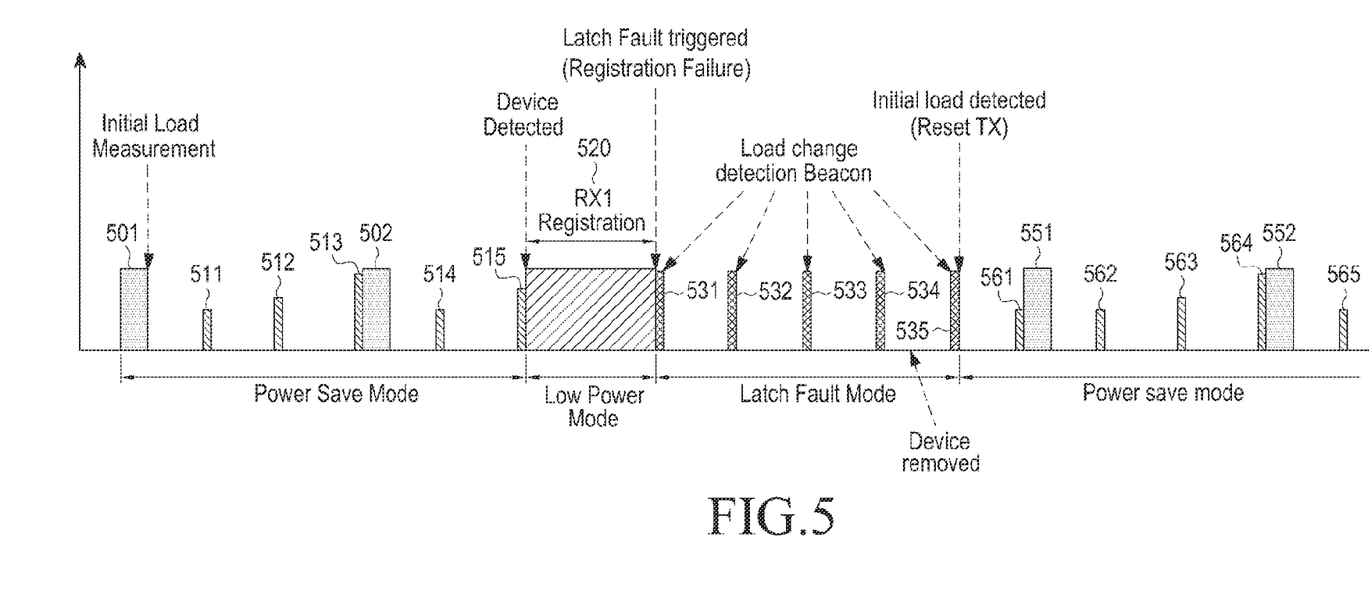
FIG. 5 is a graph illustrating time-axis power values applied by the wireless power transmitter illustrated in FIG. 4.

FIG. 4 is a flowchart illustrating a control method of a wireless power transmitter according to another embodiment of the present invention. The control method of FIG. 4 will be described in more detail with reference to FIG. 5. FIG. 5 is a graph illustrating time-axis power values applied by the wireless power transmitter illustrated in FIG. 4.

As illustrated in FIG. 4, the wireless power transmitter starts driving, or is powered up, in step S401. In addition, the wireless power transmitter resets its initial settings in step S403, and then enters a power save mode in step S405. The term "power save mode" as used herein refers to a period in which the wireless power transmitter applies a different power, whose power values are different, to its power transmitting unit. For example, the power save mode may correspond to a period in which the wireless power transmitter applies second detection power 501 and 502 and third detection power 511, 512, 513, 514 and 515 in FIG. 5, to its power transmitting unit. The wireless power transmitter may periodically apply the second detection power 501 and 502 in a second cycle, and the wireless power transmitter may apply the second detection power 501 and 502 for a second period. The wireless power transmitter may periodically apply the third detection power 511, 512, 513, 514 and 515 in a third cycle, and the wireless power transmitter may apply the third detection power 511, 512, 513, 514 and 515 for a third period. Although it is assumed that power values of the third detection power 511, 512, 513, 514 and 515 are different from each other, they may be equal to each other.

For example, after outputting the third detection power 511, the wireless power transmitter may output the third detection power 512 that has the same power value as that of the third detection power 511. If the wireless power transmitter outputs the third detection power having the same power value in this way, the third detection power may have a power value with which the wireless power transmitter may detect the lowest-power wireless power receiver, for example, a wireless power receiver in a category #1.

On the other hand, after outputting the third detection power 511, the wireless power transmitter may output the third detection power 512 that has a power value different from that of the third detection power 511. If the wireless power transmitter outputs the third detection power having different power values in this way, the third detection power may have a power value with which the wireless power transmitter may detect wireless power receivers in categories #1 to #5. For example, the third detection power 511 may have a power value with which the wireless power transmitter may detect a wireless power receiver in the category #5. The third detection power 512 may have a power value with which the wireless power transmitter may detect a wireless power receiver in the category #3. The third detection power 513 may have a power value with which the wireless power transmitter may detect a wireless power receiver in the category #1.

On the other hand, the second detection power 501 and 502 may correspond to power with which a wireless power receiver may be driven. More specifically, the second detection power 501 and 502 may have a power value with which a control & communication unit of a wireless power receiver may be driven.

The wireless power transmitter may apply the second detection power 501 and 502 and the third detection power 511, 512, 513, 514 and 515 to a power receiving unit in second and third cycles, respectively. If the wireless power receiver is placed on the wireless power transmitter, the impedance seen at a certain point of the wireless power transmitter may be changed. While applying the second detection power 501 and 502 and the third detection power 511, 512, 513, 514 and 515, the wireless power transmitter may detect a change in impedance. For example, while applying the third detection power 515, the wireless power transmitter may detect a change in impedance. In this way, the wireless power transmitter detects an object placed on the wireless power transmitter in step S407. If no object is detected in step S407, the wireless power transmitter may remains in the power save mode in which the wireless power transmitter periodically applies different power in step S405.

On the other hand, if an object is detected on the wireless power transmitter as the impedance is changed in step S407, the wireless power transmitter enters low-power mode in step S409. The term "low-power mode" as used herein refers to a mode in which the wireless power transmitter applies driving power having a power value with which a control & communication unit of a wireless power receiver may be driven. For example, in FIG. 5, the wireless power transmitter may apply driving power 520 to its power transmitting unit. The wireless power receiver receives the driving power 520 and drives its control & communication unit with the received driving power 520. Based on the driving power 520, the wireless power receiver communicates with the wireless power transmitter using a predetermined communication scheme. For example, the wireless power receiver may transmit/receive data required for authentication, and based thereon, may join the wireless power network managed by the wireless power transmitter. However, if a rogue object other than the wireless power receiver is placed on the wireless power transmitter, data transmission/reception is not performed. Accordingly, the wireless power transmitter determines whether an object placed thereon is a rogue object in step S411. For example, upon failure to receive a response from the object for a predetermined time, the wireless power transmitter determines the object to be a rogue object.

If the object is determined to be a rogue object in step S411, the wireless power transmitter enters the latch fault mode in step S413. On the other hand, if the object is not determined to be a rogue object in step S411, the wireless power transmitter proceeds with a join phase in step S419. For example, the wireless power transmitter may periodically apply first power 531 to 534 in FIG. 5 in a first cycle. While applying the first power, the wireless power transmitter may detect a change in impedance. For example, if a rogue object is removed in step S415, the wireless power transmitter detects a change in impedance, and determines that the rogue object has been removed. However, if a rogue object is not removed in step S415, the wireless power transmitter does not detect a change in impedance, and determines that the rogue object has not been removed. If the rogue object is not removed, the wireless power transmitter informs the user that the wireless power transmitter is now in an error state, by outputting, for example, at least one of a lamp light and a beep sound. Accordingly, the wireless power transmitter may include an output unit for outputting at least one of a lamp light and a beep sound.

If it is determined that the rogue object has not been removed in step S415, the wireless power transmitter remains in the latch fault mode in step S413. On the other hand, if it is determined that the rogue object has been removed in step S415, the wireless power transmitter re-enters the power save mode in step S417. For example, the wireless power transmitter may apply second power 551 and 552, and third power 561 to 565 in FIG. 5.

As described above, the wireless power transmitter enters the latch fault mode, if a rogue object other than the wireless power receiver is placed on the wireless power transmitter. In addition, the wireless power transmitter determines whether the rogue object is removed, depending on a change in impedance, which is detected based on the power applied in the latch fault mode. In other words, in the example of FIGS. 4 and 5, latch fault mode entry conditions correspond to the placement of a rogue object. In addition to the placement of a rogue object, the wireless power transmitter may have various other latch fault mode entry conditions. For example, the wireless power transmitter may be cross-connected to the wireless power receiver placed thereon, and even in this case, may enter the latch fault mode. This will be described in more detail with reference to FIG. 6.

Figure 6:
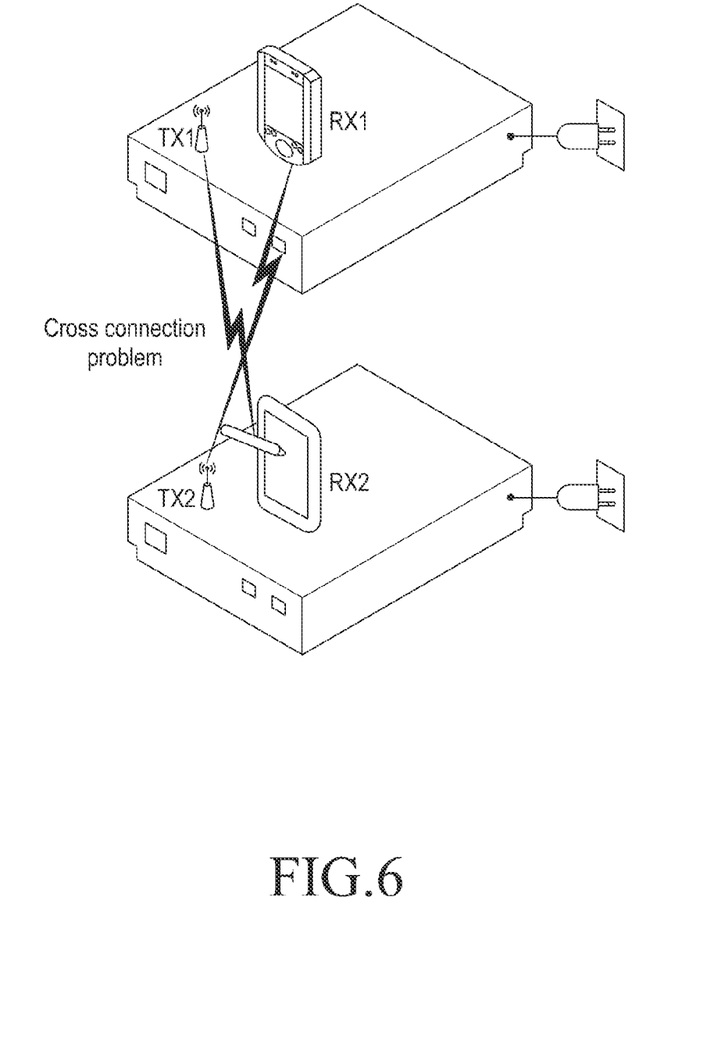
FIG. 6 is a conceptual diagram illustrating cross connection.

FIG. 6 is a conceptual diagram illustrating cross connection. In FIG. 6, a first wireless power receiver RX1 may be placed on the first wireless power transmitter TX1, and a second wireless power receiver RX2 may be placed on the second wireless power transmitter TX2. The first wireless power transmitter TX1 needs to transmit power to the first wireless power receiver RX1 placed thereon. In addition, the second wireless power transmitter TX2 needs to transmit power to the second power receiver RX2 placed thereon. Thus, preferably, the first wireless power transmitter TX1 communicates with the first wireless power receiver RX1, and the second wireless power transmitter TX2 communicates with the second wireless power receiver RX2. However, as the communication distance increases, the first wireless power receiver RX1 may join the wireless power network managed by the second wireless power transmitter TX2, and the second wireless power receiver RX2 may join the wireless power network managed by the first wireless power transmitter TX1. This is called "cross-connection". Accordingly, the first wireless power transmitter TX1 transmits the power required by the second wireless power receiver RX2, rather than the power required by the first wireless power receiver RX1, giving rise to problems. If the second wireless power receiver RX2 is higher in capacity than the first wireless power receiver RX1, the first wireless power receiver RX1 may be overcharged, causing problems. On the other hand, if the second wireless power receiver RX2 is lower in capacity than the first wireless power receiver RX1, the first wireless power receiver RX1 may be undercharged, causing problems.

Figure 7:
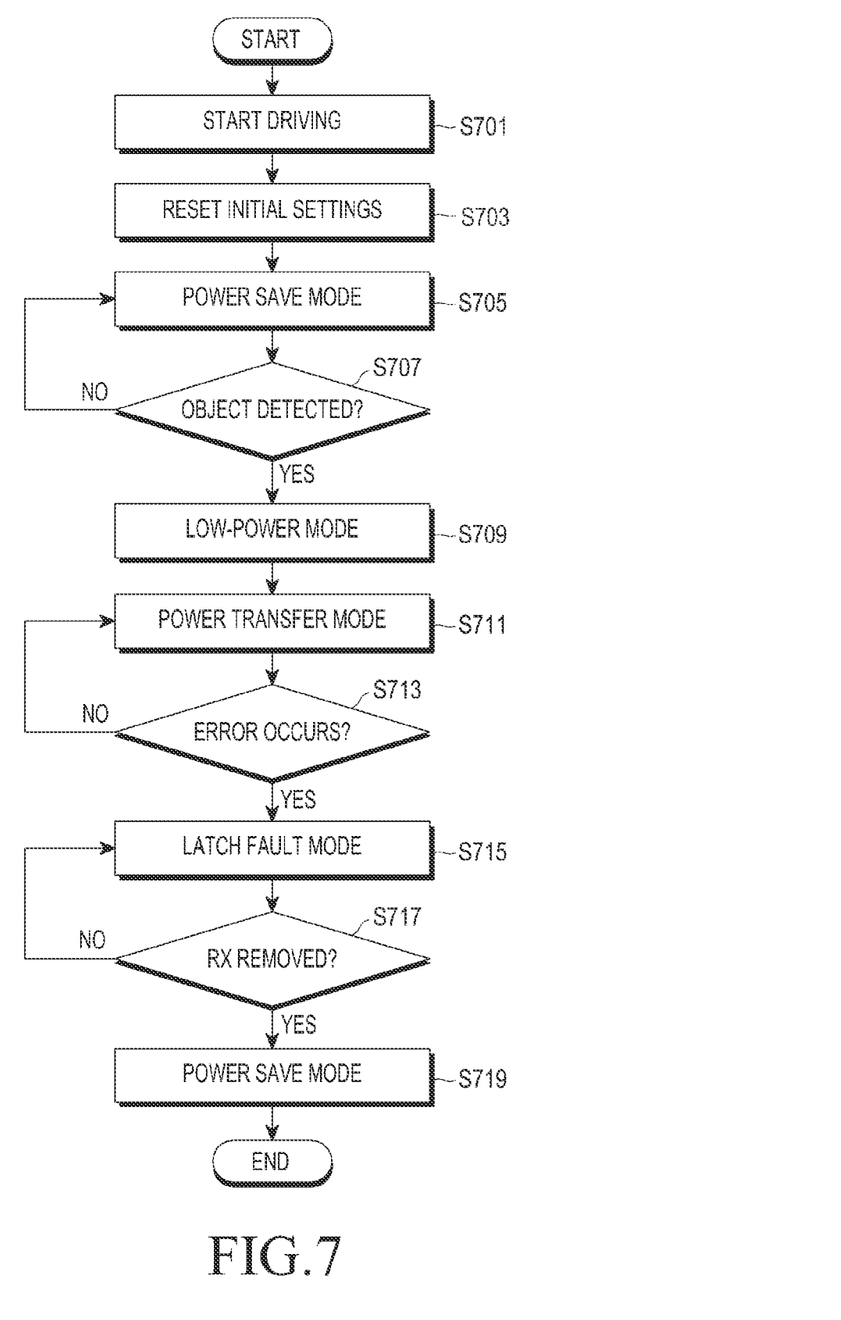
FIG. 7 is a flowchart illustrating a control method of a wireless power transmitter according to an embodiment of the present invention.

Accordingly, upon occurrence of cross connection, the wireless power transmitter is required to return to the initial state, and removal of the wireless power receiver is required. The wireless power transmitter may set, as latch fault mode entry conditions, the cross connection that a wireless power receiver placed on another wireless power transmitter join the wireless power network of the wireless power transmitter. Reference will be made to FIG. 7 to describe an operation of a wireless power transmitter during occurrence of errors including cross connection.

Figure 8:
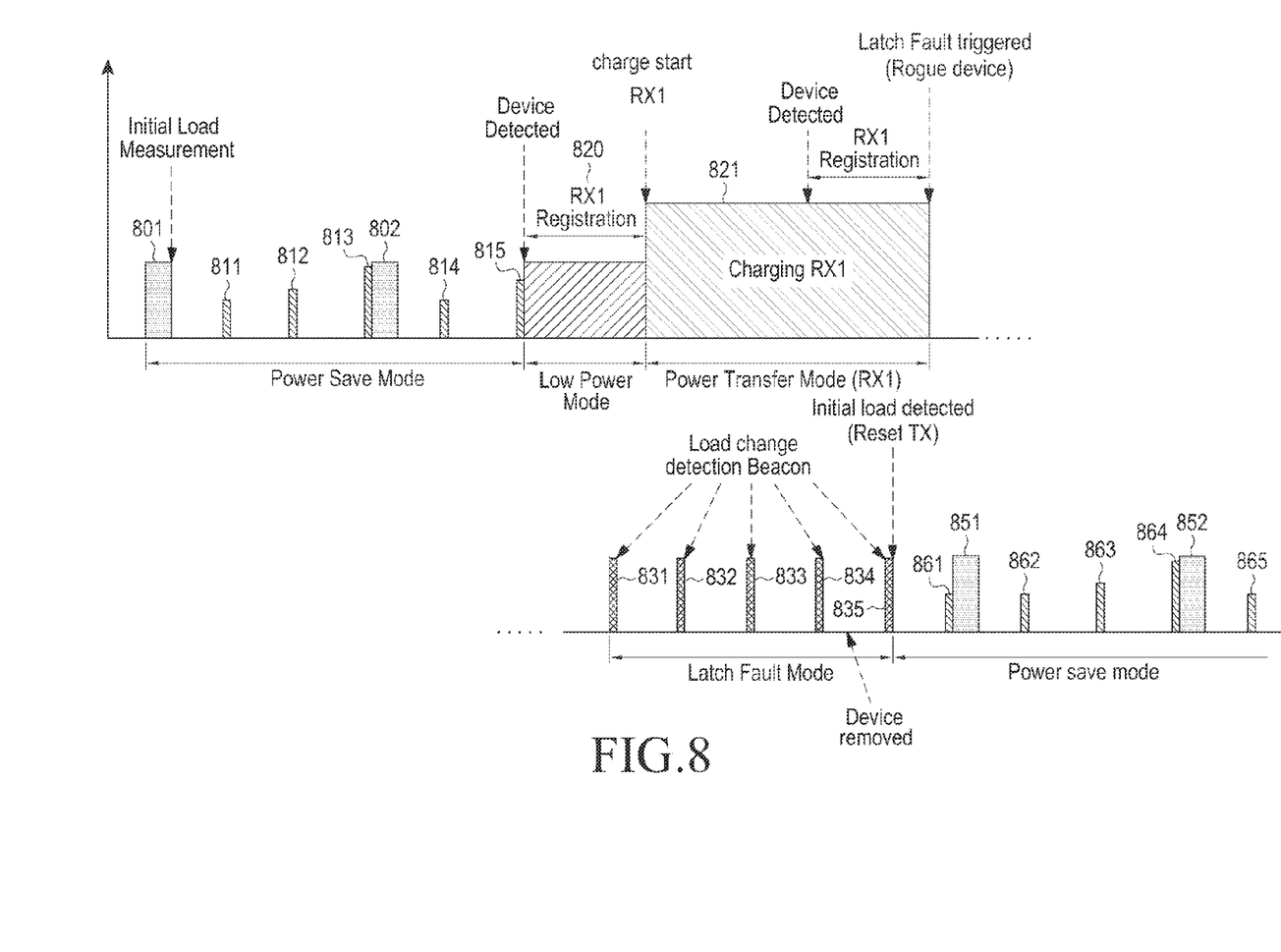
FIG. 8 is a graph illustrating time-axis power values applied by the wireless power transmitter illustrated in FIG. 7.

FIG. 7 is a flowchart illustrating a control method of a wireless power transmitter according to an embodiment of the present invention. The control method of FIG. 7 will be described in more detail with reference to FIG. 8. FIG. 8 is a graph illustrating time-axis power values applied by the wireless power transmitter illustrated in FIG. 7.

The wireless power transmitter starts driving, or is powered up, in step S701. In addition, the wireless power transmitter resets its initial settings in step S703, and then enters the power save mode in step S705. The term "power save mode" as used herein refers to a period in which the wireless power transmitter applies a different power, whose power values are different, to its power transmitting unit. For example, the power save mode may correspond to a period in which the wireless power transmitter applies second detection power 801 and 802 and third detection power 811, 812, 813, 814 and 815 in FIG. 8, to its power transmitting unit. The wireless power transmitter may periodically apply the second detection power 801 and 802 in a second cycle, and the wireless power transmitter may apply the second detection power 801 and 802 for a second period. The wireless power transmitter may periodically apply the third detection power 811, 812, 813, 814 and 815 in a third cycle, and the wireless power transmitter may apply the third detection power 811, 812, 813, 814 and 815 for a third period. Although it is assumed that power values of the third detection power 811, 812, 813, 814 and 815 are different from each other, they may be equal to each other.

The second detection power 801 and 802 correspond to power with which a wireless power receiver may be driven. More specifically, the second detection power 801 and 802 have a power value with which a control and communication unit of a wireless power receiver may be driven.

The wireless power transmitter may apply the second detection power 801 and 802 and the third detection power 811, 812, 813, 814 and 815 to a power receiving unit in second and third cycles, respectively. If the wireless power receiver is placed on the wireless power transmitter, the impedance seen at a certain point of the wireless power transmitter may be changed. While applying the second detection power 801 and 802 and the third detection power 811, 812, 813, 814 and 815, the wireless power transmitter may detect a change in impedance. For example, while applying the third detection power 815, the wireless power transmitter may detect a change in impedance. In this way, the wireless power transmitter detects an object placed on the wireless power transmitter in step S707. If no object is detected in step S707, the wireless power transmitter remains in the power save mode in which the wireless power transmitter periodically applies different power in step S705.

On the other hand, if an object is detected as the impedance is changed in step S707, the wireless power transmitter enters the low-power mode in step S709. The term "low-power mode" as used herein refers to a mode in which the wireless power transmitter applies driving power having a power value with which a control & communication unit of a wireless power receiver may be driven. For example, in FIG. 8, the wireless power transmitter may apply driving power 820 to its power transmitting unit. The wireless power receiver receives the driving power 820 and drives its control & communication unit with the received driving power 820. Based on the driving power 820, the wireless power receiver communicates with the wireless power transmitter using a predetermined communication scheme. For example, the wireless power receiver may transmit/receive data required for authentication, and based thereon, may join the wireless power network managed by the wireless power transmitter.

Thereafter, the wireless power transmitter enters the power transfer mode in which the wireless power transmitter transmits charging power in step S711. For example, the wireless power transmitter may apply charging power 821 as in FIG. 8, and the charging power is transmitted to the wireless power receiver.

In the power transfer mode, the wireless power transmitter determines whether an error occurs. The term "error" as used herein refers to placement of a rogue object on the wireless power transmitter, cross connection, over-voltage, over-current, over-temperature, and the like. The wireless power transmitter may include a sensing unit capable of measuring or detecting over-voltage, over-current, over-temperature, and the like. For example, the wireless power transmitter may measure the voltage or current at a reference point, and if the measured voltage or current exceeds a threshold, the wireless power transmitter determines that the over-voltage or over-current conditions are met. The wireless power transmitter may include a temperature sensing means, which measures the temperature of the wireless power transmitter at a reference point. If the temperature at the reference point exceeds the threshold, the wireless power transmitter determines that the over-temperature conditions are met.

In the example of FIG. 8, although an error that a rogue object is additionally placed on the wireless power transmitter is considered, the present invention is not limited thereto, and it will be apparent to those of ordinary skill in the art that the wireless power transmitter may operate in a similar process even for the placement of a rogue object thereon, cross connection, over-voltage, over-current, and over-temperature.

If no error occurs in step S713, the wireless power transmitter remains in the power transfer mode in step S711. On the other hand, if an error occurs in step S713, the wireless power transmitter enters the latch fault mode in step S715. For example, the wireless power transmitter may apply first power 831 to 835 as in FIG. 8. In addition, the wireless power transmitter may output an error occurrence indication including at least one of a lamp light and a beep sound, during the latch fault mode. If it is determined that the rogue object or the wireless power receiver has not been removed in step S717, the wireless power transmitter remains in the latch fault mode in step S715. On the other hand, if it is determined that the rogue object or the wireless power receiver has been removed in step S717, the wireless power transmitter re-enters the power save mode in step S719. For example, in the power save mode, the wireless power transmitter may apply second power 851 and 852 and third power 861 to 865 in FIG. 8.

So far, the description has been made of an operation in a case where an error occurs while the wireless power transmitter transmits charging power. A description will now be made of an operation in a case where a plurality of wireless power receivers on a wireless power transmitter may receive charging power.

Figure 9:
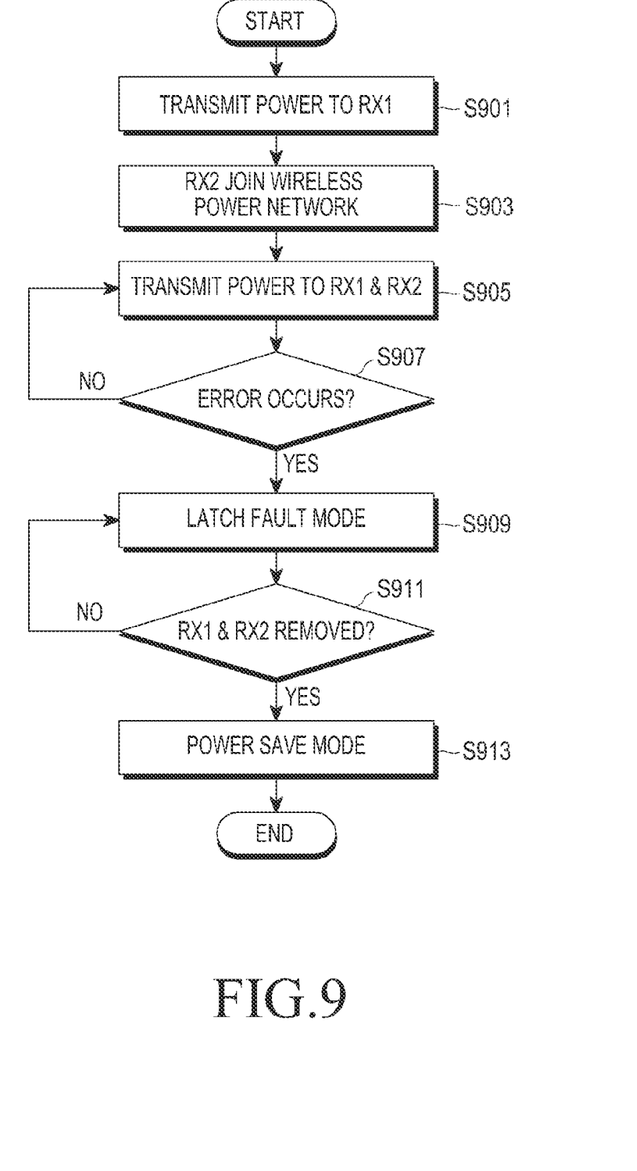
FIG. 9 is a flowchart illustrating a control method of a wireless power transmitter according to an embodiment of the present invention.
Figure 10:
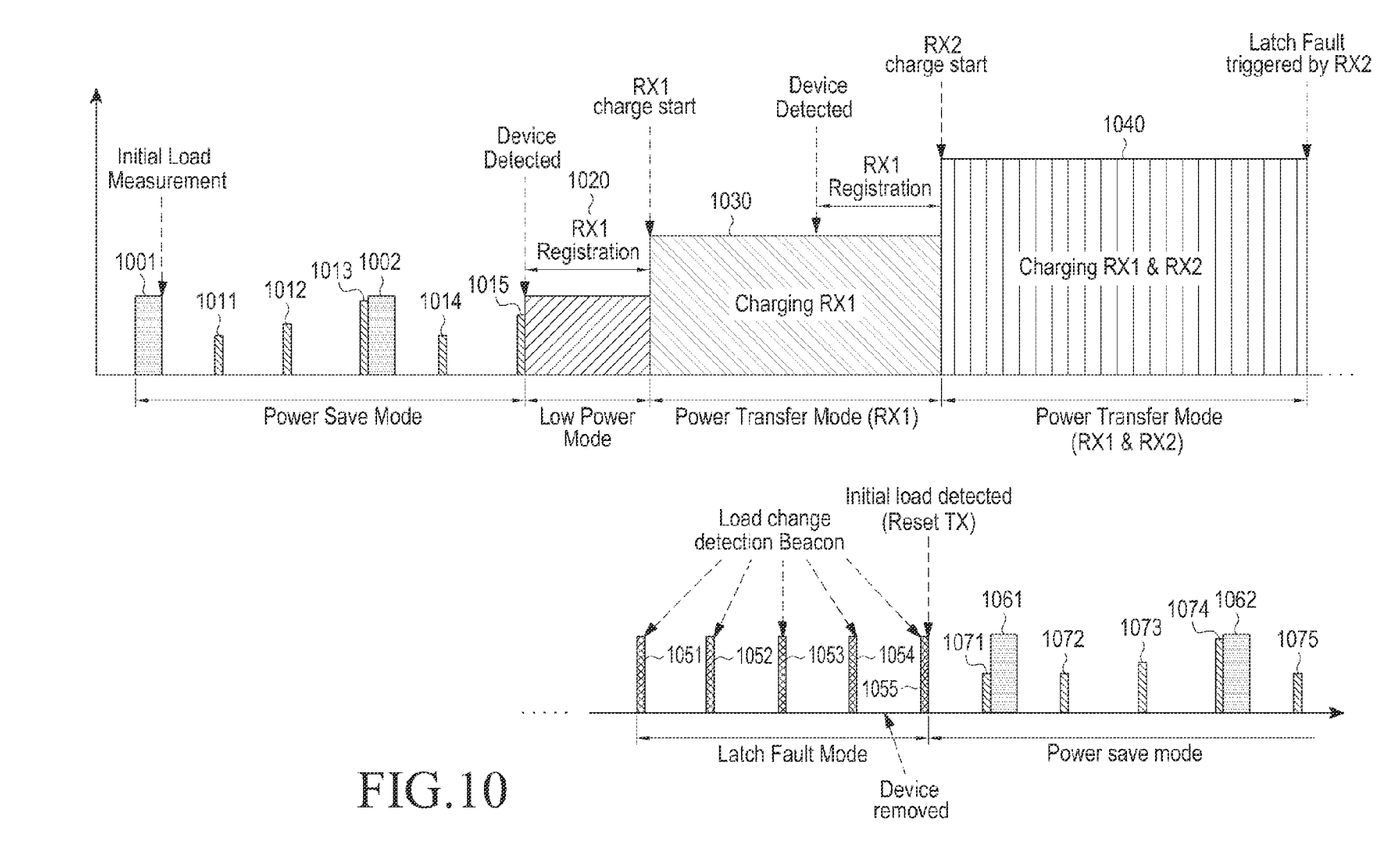
FIG. 10 is a graph illustrating time-axis power values applied by the wireless power transmitter illustrated in FIG. 9.

FIG. 9 is a flowchart illustrating a control method of a wireless power transmitter according to an embodiment of the present invention. The control method of FIG. 9 will be described in more detail with reference to FIG. 10. FIG. 10 is a graph illustrating time-axis power values applied by the wireless power transmitter illustrated in FIG. 9.

As illustrated in FIG. 9, the wireless power transmitter transmits charging power to a first wireless power receiver in step S901. The wireless power transmitter additionally causes a second wireless power receiver to join the wireless power network in step S903, so that the wireless power transmitter transmits charging power not only to the first wireless power receiver but also to the second wireless power receiver in step S905. More specifically, the wireless power transmitter may apply, to its power-transmitting unit, a sum of the charging power required by both the first and second wireless power receivers.

FIG. 10 illustrates an example of steps S901 to S905. The wireless power transmitter maintains the power save mode in which the wireless power transmitter applies second detection power 1001 and 1002 and third detection power 1011 to 1015. Thereafter, the wireless power transmitter detects the first wireless power receiver, and enters the low-power mode where the wireless power transmitter maintains detection power 1020. Thereafter, the wireless power transmitter enters the power transfer mode in which the wireless power transmitter applies first charging power 1030. The wireless power transmitter detects the second wireless power receiver, and causes the second wireless power receiver to join the wireless power network. In addition, the wireless power transmitter may apply second charging power 1040 having a power value corresponding to a sum of power values required by both the first and second wireless power receivers.

Referring back to FIG. 9, while transmitting the charging power to both of the first and second wireless power receivers in step S905, the wireless power transmitter detects the occurrence of an error in step S907. As described above, the term "error" may refer to, for example, placement of a rogue object, cross connection, over-voltage, over-current, and over-temperature. If no error occurs in step S907, the wireless power transmitter continues applying the second charging power 1040.

On the other hand, if an error occurs in step S907, the wireless power transmitter enters the latch fault mode in step S909. For example, in the latch fault mode, the wireless power transmitter may apply first power 1051 to 1055 in FIG. 10 in a first cycle. The wireless power transmitter then determines whether both of the first and second wireless power receivers are removed in step S911. For example, while applying the first power 1051 to 1055, the wireless power transmitter may detect a change in impedance. Based on whether the impedance returns to its initial value, the wireless power transmitter may determine whether both of the first and second wireless power receivers are removed.

If it is determined that both of the first and second wireless power receivers have been removed in step S911, the wireless power transmitter enters the power save mode in step S913. For example, the wireless power transmitter may apply second detection power 1061 and 1062 and third detection power 1071 to 1075 as in FIG. 10 in second and third cycles, respectively.

As is apparent from the foregoing description, even when applying charging power to a plurality of wireless power receivers, the wireless power transmitter may easily determine whether a wireless power receiver or a rogue object is removed, upon occurrence of an error.

Various aspects of the present invention provide a wireless power transmitter for efficiently determining whether a rogue object is withdrawn or removed, if an error occurs while a wireless power receiver or the rogue object is placed on the wireless power transmitter, and a method for controlling the same.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for controlling a wireless power transmitter that transmits charging power to a wireless power receiver, the method comprising:

entering a latch fault mode in response to latch fault mode entry conditions; and     after entering the latch fault mode, periodically applying a first power having a first power value to a resonant circuit, wherein the first power is for detecting a change in impedance of the wireless power transmitter caused by removal of the wireless power receiver.

2. The method of claim 1, further comprising:
maintaining, before entering the latch fault mode, a power save mode in which the wireless power transmitter periodically applies second detection power having a second power value, and periodically applies third detection power having a third power value.

3. The method of claim 2, further comprising:
detecting a change in impedance of the resonant circuit, while applying at least one of the second detection power and the third detection power;
applying, upon detecting the change in impedance, driving power for driving the wireless power receiver; and
after applying the driving power, determining whether a signal is received from the wireless power receiver.

4. The method of claim 3, wherein the latch fault mode entry conditions correspond to conditions in which the signal for joining a wireless power network is not received for a preset time.

5. The method of claim 3, wherein periodically applying the first power in the first cycle comprises:
determining that an object placed on the wireless power transmitter is a rogue object; and
maintaining the latch fault mode until the rogue object is removed.

6. The method of claim 5, wherein maintaining the latch fault mode comprises:
determining whether the rogue object is removed based on change of impedance of the resonant circuit; and
if the rogue object is removed, entering the power save mode in which the wireless power transmitter periodically applies the second detection power having the second power value in a second cycle, and periodically applies the third detection power having the third power value in a third cycle.

7. The method of claim 1, further comprising transmitting charging power to the wireless power receiver before determining entering the latch fault mode.

8. The method of claim 7, wherein the latch fault mode entry conditions correspond to conditions in which an error occurs while transmitting charging power to the wireless power receiver.

9. The method of claim 8, wherein the error corresponds to a failure to receive the signal for joining a wireless power network managed by the wireless power transmitter for a preset period, if an object is placed on the wireless power transmitter while transmitting the charging power.

10. The method of claim 8, wherein the error corresponds to case in which a wireless power receiver placed on another wireless power transmitter is cross-connected to the wireless power transmitter.

11. The method of claim 10, wherein periodically applying the first power in the first cycle comprises applying the first power until the wireless power receiver placed on the another wireless power transmitter is removed.

12. The method of claim 8, wherein the error comprises at least one of an over-voltage condition, an over-current condition and an over-temperature condition of the wireless power transmitter.

13. The method of claim 1, wherein periodically applying the first power comprises outputting at least one of a lamp light and a beep sound.

14. A wireless power transmitter for transmitting charging power to a wireless power receiver, the wireless power transmitter comprising:
a resonant circuit configured to transmit the charging power to the wireless power receiver; and
a controller configured to:
enter a latch fault mode in response to latch fault mode entry conditions, and
after entering the latch fault mode, periodically apply first power having a first power value to the resonant circuit,
wherein the first power is for detecting a change in impedance of the wireless power transmitter caused by removal of the wireless power receiver.

15. The wireless power transmitter of claim 14, wherein before entering the latch fault mode, the controller maintains a power save mode in which the wireless power transmitter periodically applies second detection power having a second power value, and periodically applies third detection power having a third power value.

16. The wireless power transmitter of claim 15, wherein the controller detects a change in impedance of the resonant circuit while applying at least one of the second detection power and the third detection power, applies driving power for driving the wireless power receiver to the resonant circuit when the change in impedance is detected, and determines whether a signal is received from the wireless power receiver.

17. The wireless power transmitter of claim 16, wherein the latch fault mode entry conditions correspond to conditions in which the signal for joining a wireless power network is not received by the communication unit for a preset time.

18. The wireless power transmitter of claim 16, wherein the controller determines that an object placed on the wireless power transmitter is a rogue object and maintains the latch fault mode until the rogue object is removed, determines whether the rogue object is removed based on change of impedance of the resonant circuit, if the rogue object is removed, and enters the power save mode in which the wireless power transmitter periodically applies the second detection power having the second power value in a second cycle, and periodically applies the third detection power having the third power value in a third cycle.

19. The wireless power transmitter of claim 14, wherein the power transmitting unit transmits charging power to the wireless power receiver before entering the latch fault mode, wherein the latch fault mode entry conditions correspond to conditions in which an error occurs while transmitting charging power to the wireless power receiver.

20. The wireless power transmitter of claim 19, wherein the error corresponds to a failure to receive the signal for joining a wireless power network managed by the wireless power transmitter for a preset period, if an object is placed on the wireless power transmitter while transmitting the charging power.

21. The wireless power transmitter of claim 19, wherein the error corresponds to case in which a wireless power receiver placed on another wireless power transmitter is cross connected with the wireless power transmitter.

22. The wireless power transmitter of claim 19, wherein the error comprises at least one of an over-voltage condition, an over-current condition and an over-temperature condition of the wireless power transmitter.

23. The wireless power transmitter of claim 14, further comprising an output unit for outputting at least one of a lamp light and a beep sound,
wherein the controller controls the output unit to output at least one of the lamp light and the beep sound, if the latch fault mode entry conditions are met.

* * * * *